United States Patent [19]

Nagatomo

[11] Patent Number: 5,426,511
[45] Date of Patent: Jun. 20, 1995

[54] FACSIMILE SYSTEM WITH BASE UNIT CONNECTED TO WIRE NETWORK AND IN COMMUNICATION WITH MULTIPLE EXTENSIONS SETS BY WIRE OR RADIO TRANSMISSION

[75] Inventor: Kenichi Nagatomo, Tokyo, Japan

[73] Assignee: Kabushiki Kaisha Toshiba, Kawasaki, Japan

[21] Appl. No.: 757,809

[22] Filed: Sep. 11, 1991

[30] Foreign Application Priority Data

Sep. 14, 1990 [JP] Japan ................... 2-245473

[51] Int. Cl.⁶ .................. H04N 1/00; H04N 1/32; H04N 1/327; H04M 11/06
[52] U.S. Cl. ..................... 358/402; 358/407; 358/436; 358/440; 358/468; 379/58; 379/100; 455/66
[58] Field of Search ............ 358/402, 407, 408, 442, 358/468, 296, 439, 440, 435, 436, 404, 434; 379/100, 93, 63, 58, 57; 340/825.44; 455/38.1, 54.1, 66, 68

[56] References Cited

U.S. PATENT DOCUMENTS

| | | | |
|---|---|---|---|
| 3,513,443 | 2/1967 | Andersen | 358/158 |
| 4,106,060 | 8/1978 | Chapman, Jr. | 358/402 |
| 4,558,369 | 12/1985 | Shinohara et al. | 358/408 |
| 5,051,839 | 9/1991 | Nakahara et al. | 358/407 |
| 5,091,790 | 2/1992 | Silverberg | 358/407 |
| 5,127,047 | 6/1992 | Bell et al. | 379/100 |
| 5,283,665 | 2/1994 | Ogata | 358/407 |

FOREIGN PATENT DOCUMENTS 64564 4/1985 Japan ................... 379/100

Primary Examiner—Scott A. Rogers
Attorney, Agent, or Firm—Finnegan, Henderson, Farabow, Garrett & Dunner

[57] ABSTRACT

A facsimile system includes a base station connected to a wire network, and a plurality of extension sets connected to the base station through radio networks. The base station includes an NCU (Network Control Unit) for receiving an image signal received through the wire network, a printer for outputting an image corresponding to the image signal received by the NCU, a control circuit for calling an extension set in response to a call signal received through the wire network, a switching circuit for connecting the wire network to the NCU in response to a response signal transmitted from the called extension set, and a transceiver for receiving the image signal transmitted from the extension set and sending the image signal to the wire network. The extension set includes an image sensor for scanning a document and outputting an image signal corresponding to the document image, a transceiver for transmitting the image signal output from the image sensor to the base station, an operation section for manually designating the start of facsimile reception, and an extension set control circuit for sending out the response signal to the base station when the start of facsimile reception is instructed.

8 Claims, 10 Drawing Sheets

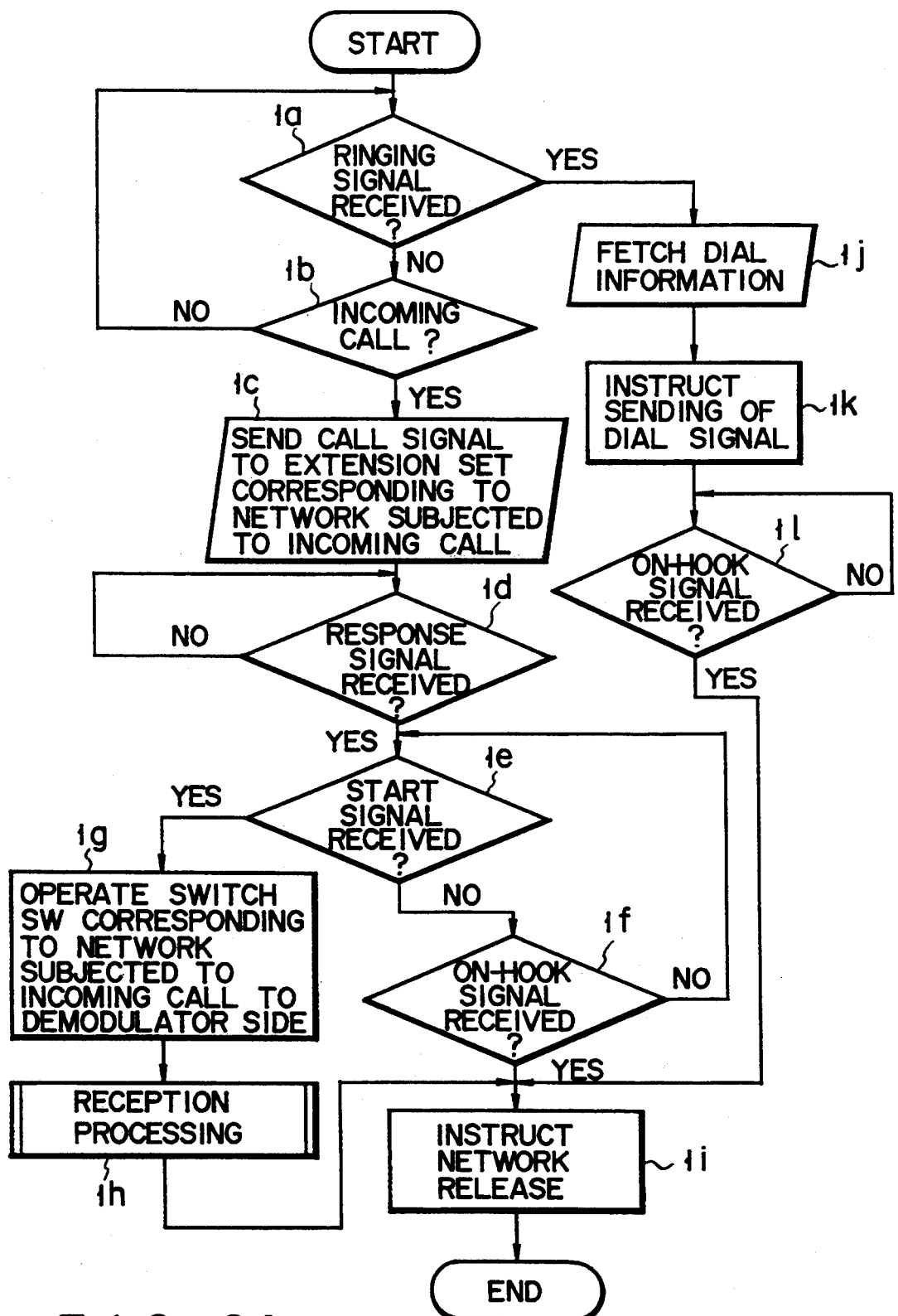
F I G. 2A

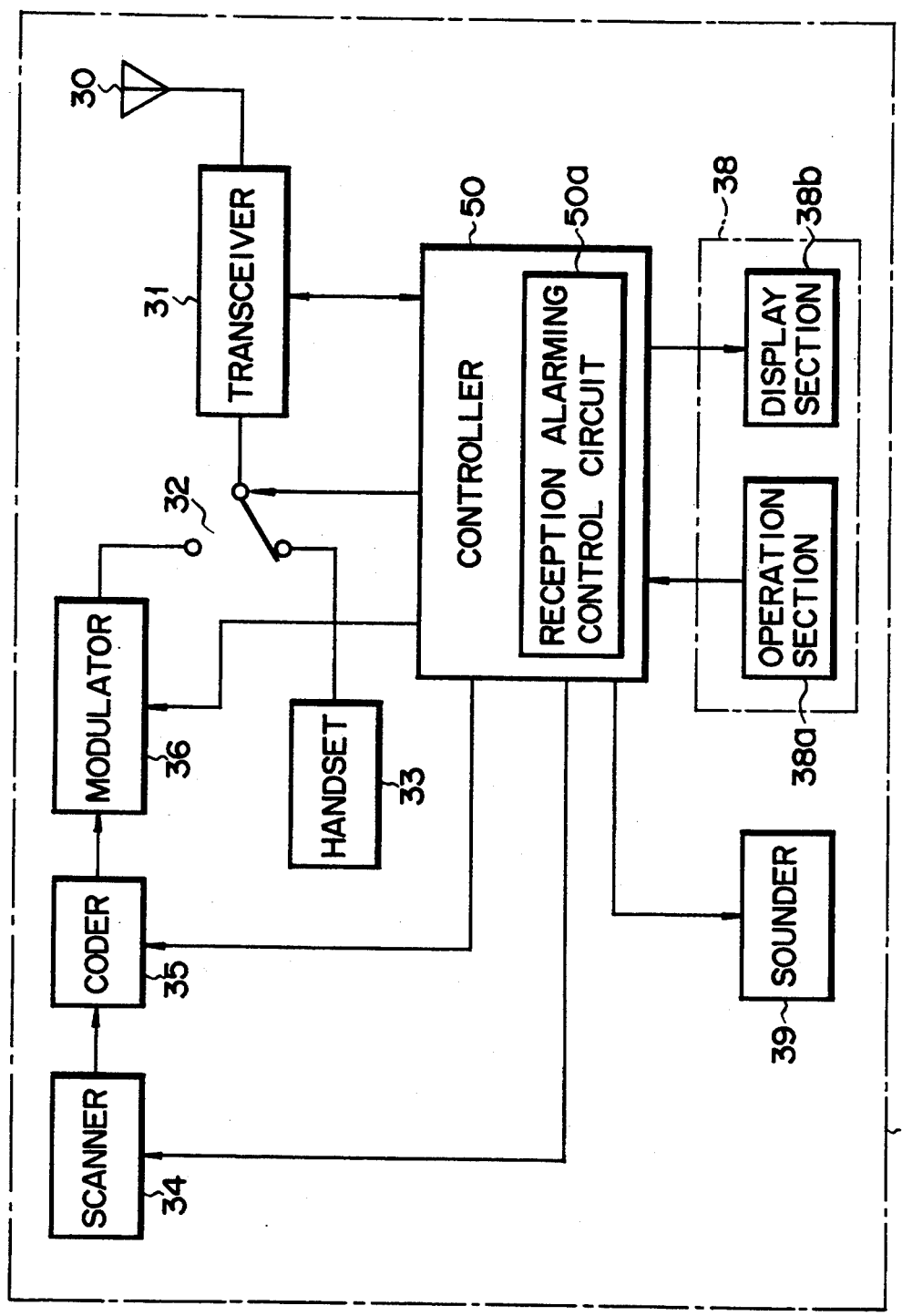
F I G. 3B

FACSIMILE SYSTEM WITH BASE UNIT CONNECTED TO WIRE NETWORK AND IN COMMUNICATION WITH MULTIPLE EXTENSIONS SETS BY WIRE OR RADIO TRANSMISSION

BACKGROUND OF THE INVENTION

1. Field of the Invention

The present invention relates to a facsimile system.

2. Description of the Related Art

A facsimile apparatus generally includes a receiver for receiving image signals, a printer for printing an image corresponding to the image signals received by the receiver on a paper sheet, a paper cassette for storing paper sheets, a paper feeder for feeding a paper sheet stored in the paper cassette to the printer, a document reader for reading a document, a document transfer for transferring the document, and a transmitter for transmitting the image signals read by the document reader. Since this facsimile apparatus includes a number of units such as a document reader, a printer, etc., it is very expensive.

For this reason, one facsimile apparatus is usually shared by a number of persons. When a person wants to transmit a document, he or she must go to a place where the facsimile apparatus is installed, thus resulting in cumbersome and time-consuming operations. If facsimile reception is scheduled, a user must repeatedly go to the place where the facsimile apparatus is installed to check whether a scheduled document has been received, thus resulting in inconvenience. In order to eliminate this inconvenience, the number of facsimile apparatuses must be increased. Since the facsimile apparatus, however, is expensive, as described above, an increase in the number of facsimile apparatuses costs a lot. In addition, works and adjustment by specialists are required during installation of the facsimile apparatuses.

SUMMARY OF THE INVENTION

It is an object of the present invention to provide a facsimile system capable of providing a large number of portable sets at a relatively low cost and improving convenience during its use.

According to an aspect of the present invention, there is provided a facsimile system comprising a base station and at least one extension set. The base station has a wire receiver such as a demodulator for receiving an image signal received through a wire network such as a telephone network, an output device such as a printer or display for outputting an image corresponding to the image signal received by the wire receiver, a calling device for connecting the wire network which has received a call signal received through the wire network to the corresponding extension set through the wire or radio network in response to the call signal received through the wire network, and for calling this extension set, a switching section, including a switching circuit constituted by, e.g., a plurality of switches, for connecting the wire network which has received the call signal to the wire receiver in response to a signal for designating the start of facsimile reception of information transmitted from the extension set called by the calling device, and a receiver for receiving the image signal radio-transmitted from the extension set onto the wire network. The extension set has an image reader such as a scanner for producing an image signal corresponding to a document image, a transmitter for radio- or wire-transmitting the image signal generated by the reader, an input device for manually designating the start of facsimile reception, and a start designation signal sending circuit for sending a facsimile reception start signal for instructing a start of reception of the image signal to the base station.

According to another aspect of the present invention, there is provided a facsimile system comprising a base station and at least one extension set. The base station has a wire receiver such as a demodulator for receiving an image signal received through a wire network, an output device such as a printer or display for outputting an image corresponding to the image signal received by the wire receiver, a reception acknowledgment circuit for acknowledging facsimile reception to an extension set corresponding to the wire network which has received the image signal upon reception of the image signal by the wire receiver, and a receiver for receiving the image signal received from the extension set and sending it to the wire network. The extension set has a reader such as a scanner for generating an image signal corresponding to an image of a document, a transceiver for transmitting the image signal generated by the reader to the base station, and a reception alarm unit, responsive to the acknowledgement of facsimile reception from the base station and having a display section and reception acknowledgement controller, for alarming the facsimile reception.

An apparatus associated with facsimile reception need not be arranged in each extension set in the facsimile system of the present invention, thereby simplifying the arrangement of the extension set at low cost.

A large number of terminals (extension sets) can be installed at a relatively low cost.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 2A and 2B are flow charts showing processing sequences of a base station controller and an extension set controller which are shown in FIGS. 1A and 1B;

FIG. 3B is a block diagram of the extension set shown in FIG. 3A;

DETAILED DESCRIPTION OF THE PREFERRED EMBODIMENTS

Figure 1A:
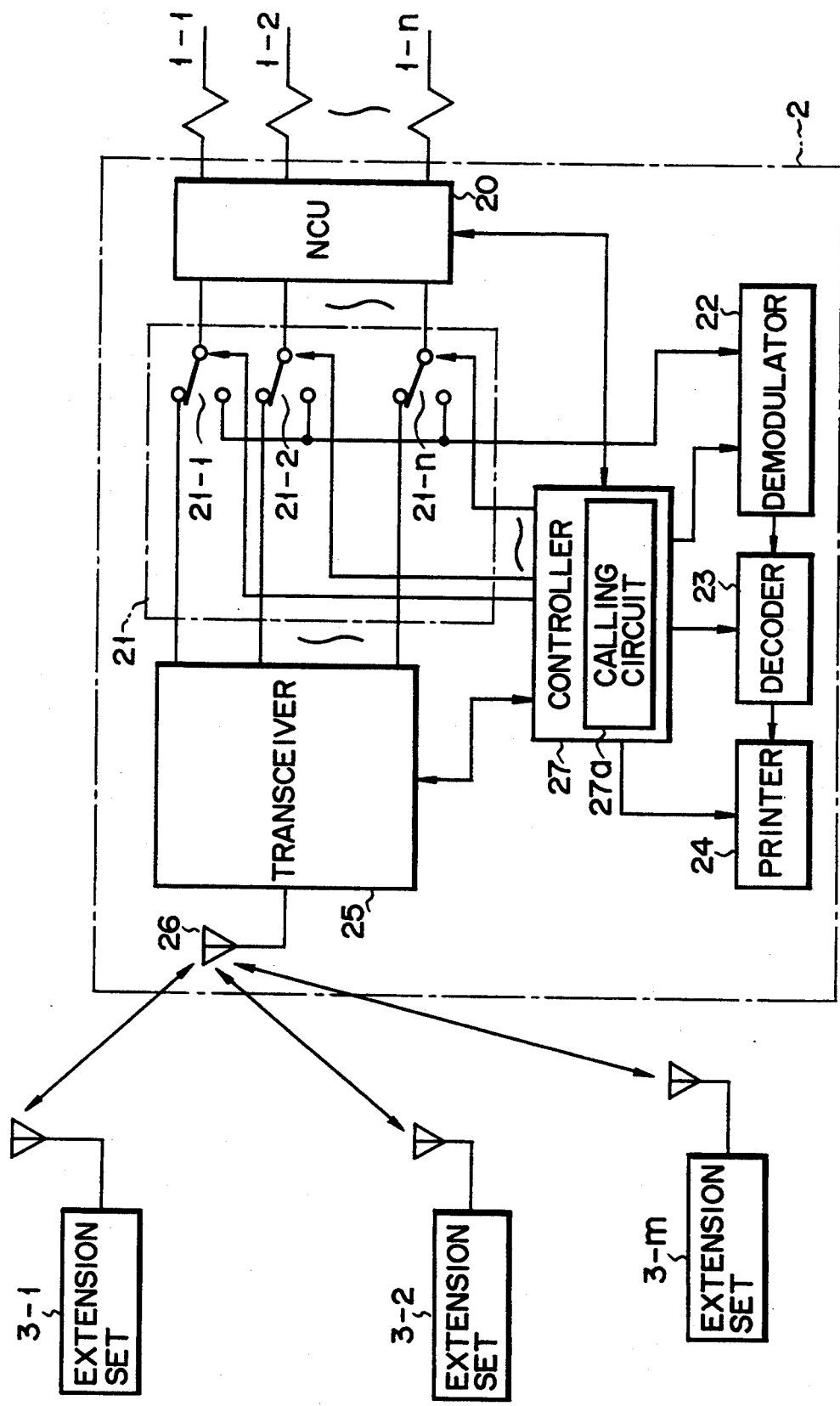
FIG. 1A is a block diagram of a facsimile system according to an embodiment of the present invention.

In a facsimile system shown in FIG. 1A, a base station 2 is connected to n telephone networks 1-1, 1-2, ..., 1-n serving as wire networks, and m extension sets 3-1, 3-2, ..., 3-m are connected to the base station 2 through wire networks. The number n of telephone networks and the number m of extension sets satisfy relation n≧m. Each of the extension sets 3-1 to 3-m is permanently assigned with a corresponding one of the telephone networks 1-1 to 1-n.

The base station 2 comprises an NCU (Network Control Unit) 20, a switching circuit 21 connected to the NCU 20, a demodulator 22 connected to the switching circuit 21, a decoder 23 connected to the output of the demodulator 22, an output device 24 constituted by a printer, display, or the like, a transceiver 25 connected to the NCU 20 through the switching circuit 21, an antenna 26 connected to the transceiver 25, and a controller (to be referred to as a base station controller hereinafter) 27. The NCU 20 is connected to the telephone networks 1-1 to 1-n and performs open/closed DC loop detection, call signal detection, and output of a dial signal. The switching circuit 21 is constituted by n (the same number as that of the telephone networks) switches 21-1, 21-2...., 21-n. The switches 21-1 to 21-n are connected to the telephone networks 1-1 to 1-n, respectively. The connected telephone network is connected to either the demodulator 22 or the transceiver 25.

Image signals transmitted through the telephone networks 1-1 to 1-n are input to the demodulator 22 through the NCU 20 and the switching circuit 21. Each image signal is received by the demodulator 22 and is decoded by the decoder 23. The resultant baseband image signal is input to the output device 24 and is printed out as an image on a paper sheet at the output device 24.

The transceiver 25 exchanges speech and control signals with the extension sets 3-1 to 3-m and receives image signals transmitted from the extension sets 3-1 to 3-m through the antenna 26.

The base station controller 27 controls all components constituting the base station 2. The base station controller 27 comprises, e.g., a microcomputer as a main control unit. More specifically, the base station controller 27 comprises a control circuit for controlling various circuit elements constituting the base station 2 and a calling circuit 27a for calling an extension set corresponding to the telephone network subjected to an incoming call.

Figure 1B:
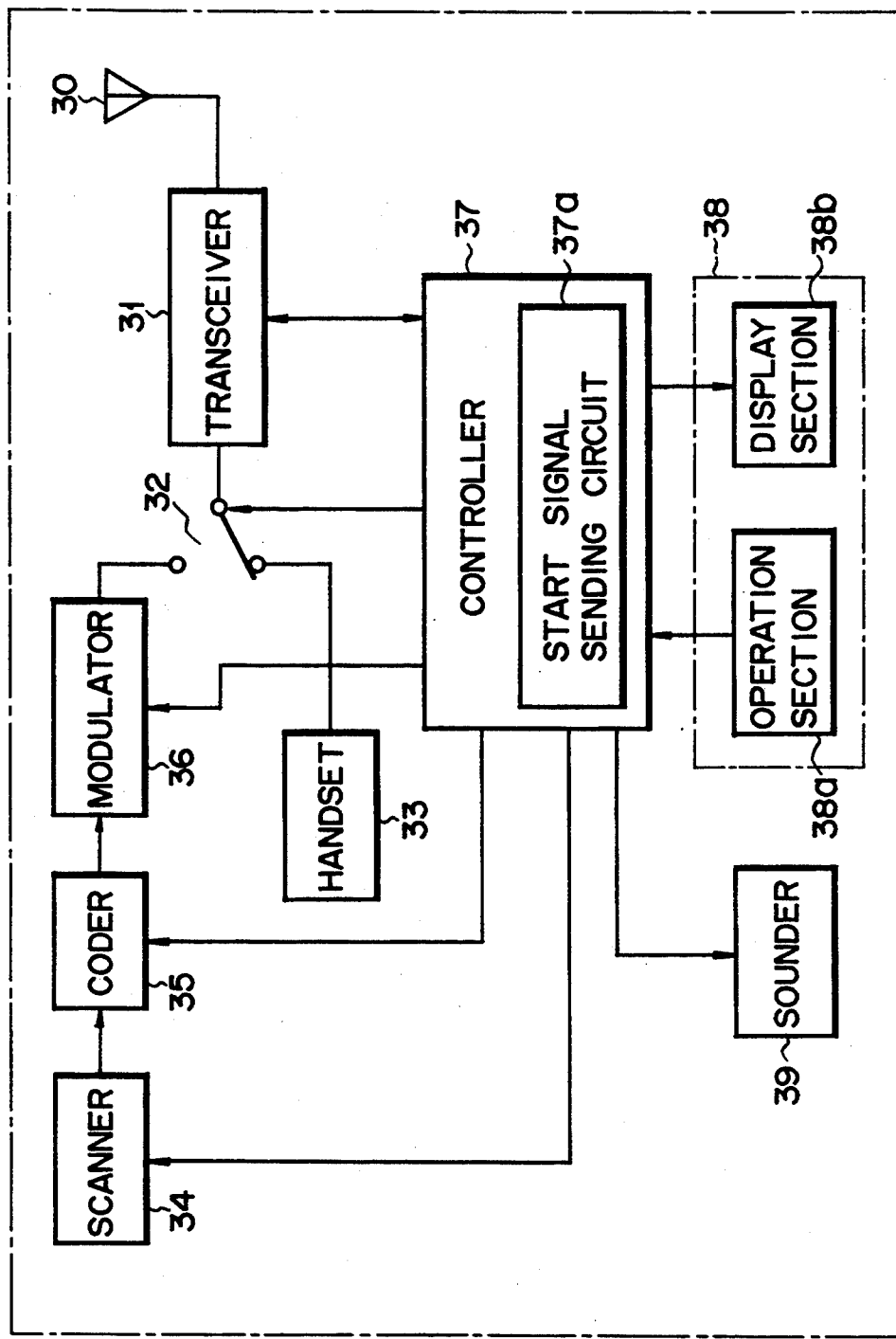
FIG. 1B is a block diagram of an extension set.

As shown in FIG. 1B, the extension set 3-1 comprises an antenna 30, a transceiver 31 connected to this antenna 30, a handset 33, a scanner 34, a coder 35 connected to the output of the scanner 34, a modulator 36 connected to the output of the coder 35, a switch 32 for switching between the handset 33 and the modulator 36, a controller (to be referred to as an extension set controller hereinafter) 37, an operation panel 38, and a sounder 39. Although the arrangements of the extension sets 3-2 to 3-m are omitted, they are the same as that of the extension set 3-1.

The transceiver 31 exchanges speech and control signals with the base station 2 and transmits through the antenna 30 to the base station 2 the image signal obtained such that the baseband image signal obtained by reading the document by the scanner is coded and modulated by the coder 35 and the modulator 36.

The switch 32 connects the transceiver 31 to either the modulator 36 or the handset 33 constituted by a transmitter and a receiver.

The extension set controller 37 controls the extension set 3-1 (3-2 to 3-m). The extension set controller 37 has, e.g., a microcomputer as a main control circuit. The extension set controller 37 further includes a reception start signal sending circuit 37a for outputting a reception start signal for instructing the start of facsimile reception to the base station 2. The operation panel 38 comprise an operation section 38a for causing an operator to input data to the extension set controller 37 and a display section 38b for displaying various pieces of information to the operator. The sounder 39 generates a call tone.

Operations of the facsimile system having the arrangement as described above will be described with reference to control sequences of the base station controller 27 and the extension set controller 37.

Figure 2B:
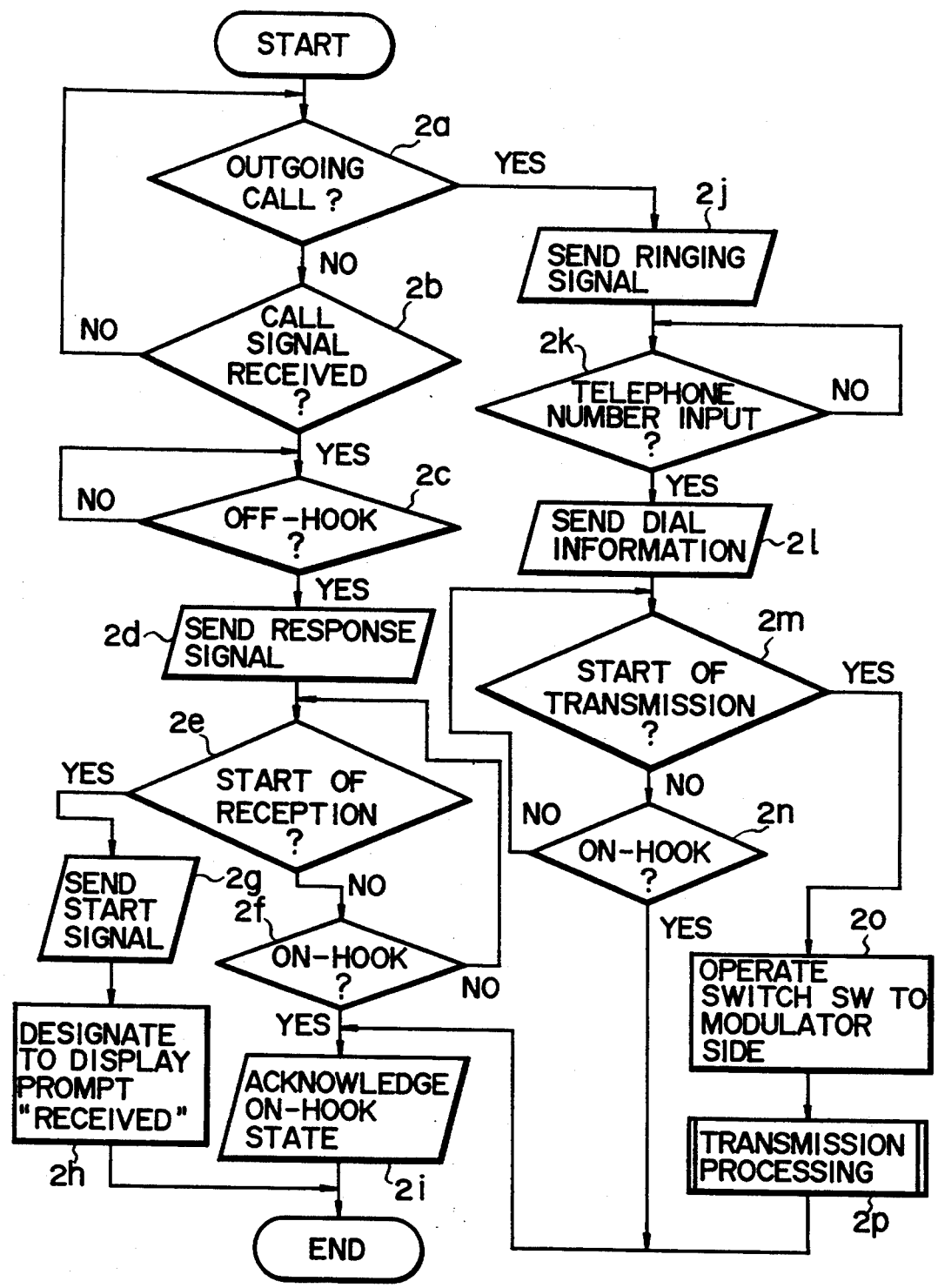

In steps 1a and 1b, as shown in FIG. 2A, the base station controller 27 repeatedly monitors reception of a ringing signal and reception of an incoming call in a standby state. In steps 2a and 2b, as shown in FIG. 2B, the extension set controller 37 repeatedly monitors generation of an outgoing call and a call signal in the standby state.

An operation performed upon reception of an incoming call in the standby state will be described below.

When an incoming call is received through one of the telephone networks 1-1 to 1-n, and reception of the incoming call is acknowledged from the NCU 20 to the base station controller 27, the base station controller 27 sends a call signal through the antenna 26 to an extension set (the incoming call is received by the extension set 3-1 through the telephone network 1-1 in the following description) corresponding to the network subjected to the incoming call in step 1c. The processing in step 1c is performed by the calling circuit 27a.

When the call signal sent from the base station 2, as described above, through the antenna 30 and the transceiver 31, is received, the extension set controller 37 in the extension set 3-1 determines the reception of the call signal, and the flow advances from step 2b to step 2c. In step 2c, the extension set controller 37 causes the sounder 39 to produce a call tone and waits for an off-hook operation.

When an operator hears the call tone and performs an off-hook operation upon depression of a predetermined button in the operation section 38a, the flow of the extension set controller 37 advances from step 2c to step 2d. In step 2d, the extension set controller 37 sends a response signal to the base station through the transceiver 31 and the antenna 30. Thereafter, in steps 2e and 2f, the extension set controller 37 waits for switching designation or an on-hook operation.

Meanwhile, the base station controller 27 sends out the call signal in step 1c, as described above, and waits for reception of the response signal from the call signal destination in step 1d. In this state, as described above, the response signal is sent out from the extension set controller 37 through the transceiver 31 and the antenna 30. This response signal is received by the antenna 26 and the transceiver 25 and is input to the base station controller 27, the flow of the base station controller 27 transits from step 1d to step 1e since the controller 27 determines the reception of the response signal. In steps 1e and 1f, the base station controller 27 waits for reception of the start or on-hook signal.

In this state, the switches 21-1 to 21-n of the switching circuit 21 are operated to enable the transceiver 25. The switch 32 in the extension set controller 37 is set to a position for selecting the handset 33. The handset 33 of the extension set 3-1 is kept connected to the telephone network 1-1 and is then connected to a mating terminal connected through the telephone network 1-1 and a public network (not shown). For example, if the mating terminal is a facsimile apparatus and facsimile transmission is to be performed, the mating terminal sends back a CNG (Calling Tone) signal. The receiver in the handset 33 rings in response to the CNG signal. The operator recognizes facsimile reception upon ringing and the start of facsimile reception is designated with a predetermined button arranged in the operation section 38a. The flow of the extension set controller 37 advances from step 2e to step 2g upon designation of the start of facsimile reception. In step 2g, the extension set controller 37 sends a start signal to the base station through the transceiver 31 and the antenna 30. Thereafter, in step 2h, the extension set controller 37 designates to display a prompt "received" on the display section 38b, and the processing is ended. The display section 38b turns on an LED arranged for indicating the prompt "received", or causes an LCD to display characters and an image. This indication or display can be canceled by, e.g., a reset operation on the operation section 38a.

The base station controller 27 waits for reception of the start signal or the on-hook signal in steps 1e and 1f. When the start signal is sent from the extension set 3-1, as described above, the flow advances from step 1e to step 1g since reception of the start signal is determined. In step 1g, the base station controller 27 causes the switch (21-1) corresponding to the telephone network (1-1) subjected to an incoming call to operate to a position corresponding to the demodulator 22. In step 1h, reception processing is performed by the demodulator 22, the decoder 23, and the output device 24 in accordance with a known general sequence. Upon completion of the reception processing, in step 1i, the base station controller 27 instructs network release to the NCU 20, thereby completing the processing.

When the operator performs an off-hook operation and the handset 33 is kept connected to the mating terminal i.e. extension set, and when a voice is reached from the mating terminal, normal telephone communication is performed. In this case, the operator continuous speech communication. When speech communication is ended, and the operator performs an on-hook operation, the flow of the extension set controller 37 advances from step 2f to step 2i. In step 2i, the on-hook signal is transmitted to the base station 2 through the transceiver 31 and the antenna 30, thereby completing the processing. In this case, the flow of the base station controller 27 advances from step 1f to step 1i upon reception of the on-hook signal output from the extension set 3-1. In step 1i, the network release is designated to the NCU 20, and the processing is ended.

An operation performed upon generation of an outgoing call in the standby state will be described below.

When the outgoing call is designated upon operation of a predetermined button in the operation unit 38a in the extension set (3-1), the flow of the extension set controller 37 advances from step 2a to step 2j. In step 2j, a ringing signal is sent to the base station 2 through the transceiver 31 and the antenna 30. In step 2k, the extension set controller 37 waits for reception of a telephone number of a call destination from the operation section 38a. If the telephone number is received, the flow advances to step 2l. In step 2l, the extension set controller 37 sends dial information corresponding to the telephone number input in step 2k to the base station 2 through the transceiver 31 and the antenna 30.

When the base station 2 receives the ringing signal send from the extension set 3-1, the flow of the base station controller 27 advances from step 1a to step 1j. In step 1j, the base station controller 27 sequentially receives the ringing signal and the dial information sent from the extension set 3-1 through the antenna 27 and the transceiver 25. In step 1k, the received dial information is sent to the NCU 20. The NCU 20 sends a dial signal corresponding to the dial information to the telephone network 1-1 corresponding to the extension set 3-1 as a call source terminal. Calling to the mating terminal is performed through a public network. If the mating terminal responds to this call, the mating terminal is connected to the handset 33 through the base station.

When the mating extension set, i.e., the destination extension set, responds to the call and is connected to the call source extension set, if the operator wants to perform normal telephone communication, he performs telephone communication. However, when facsimile transmission is to be performed, the operator depresses a predetermined button in the operation section 38a, thereby instructing the start of facsimile transmission.

In this state, in steps 2m and 2n, the extension set controller 37 waits for instruction of the start of facsimile transmission or an on-hook operation. When the start of facsimile transmission is instructed, as described above, the flow advances from step 2m to step 2o. In step 2o, the switch 32 is set to the modulator 36 side. Thereafter, in step 2p, the extension set controller 37 causes the scanner 34, the coder 35, and the modulator 36 to perform transmission processing in accordance with a known general sequence. When this transmission processing is completed, the extension set controller 37 sends the on-hook signal to the base station 2 through the transceiver 31 and the antenna 30.

when the operator is to perform not facsimile transmission but normal telephone communication, the operator performs the on-hook operation upon completion of the telephone communication. The flow of the extension set controller 37 advances from step 2n to step 2i. In step 2i, the on-hook signal is sent to the base station 2 through the transceiver 31 and the antenna 30, thereby completing the processing.

In step 1k, the base station controller 27 instructs the output of a dial signal to the NCU 20. In step 1l, the base station controller 27 waits until the on-hook signal is received. When the base station controller 27 receives the on-hook signal from the extension set 3-1, the flow advances to step 1i. In step 1i, the network release is instructed to the NCU 20, thereby completing the processing.

In this embodiment, the facsimile system comprises the base station 2 connected to the n telephone circuits 1-1, 1-2, . . . , 1-n as wire networks, and the m extension sets 3-1, 3-2, ..., 3-m connected to the base station 2 through radio networks. Constituting components for facsimile reception (i.e., the demodulator 22, the decoder 23, and the output device 24), and the NCU 20 are arranged in the base station 2. Constituting elements for facsimile transmission, i.e., the scanner 34, the decoder 35, and the modulator 36 are arranged in each of the extension sets 3-1 to 3-m. Therefore, the facsimile extension sets 3-1 to 3-m are very simple at low cost. Even if a plurality of extension sets are arranged in a facsimile system, the facsimile system can be arranged at a relatively low cost. By arranging a plurality of extension sets, each extension set can be shared by several persons or used by each individual person. The extension sets can be installed near the users, thus improving convenience. Each user need not move to a remote location, as opposed to the conventional case, in order to perform facsimile transmission, thereby reducing the cumbersome and time-consuming operations.

When facsimile transmission cannot be performed in the extension sets 3-1 to 3-m, a user must go to the installation position of the base station 2 to get a document received in facsimile reception. In this case, when facsimile reception is detected, a corresponding one of the extension sets 3-1 to 3-m is called. Since facsimile reception at the base station 2 can be started with designation by the operator, the operator need not repeatedly go to the installation position of the base station 2 to check the facsimile reception. The operator can known detection of facsimile reception in his place. If facsimile reception is performed, its prompt is displayed on the display section 38b. Even if a relatively long period of time has elapsed upon designation of the start of facsimile reception, facsimile reception can be more appropriately known to the operator.

Since the base station 2 is connected to the extension sets 3-1 to 3-m through radio networks, any additional installation work is not required to increase the number of extension sets 3-1 to 3-m, thereby improving extensibility.

The second embodiment of the present invention will be described below.

Figure 3A:
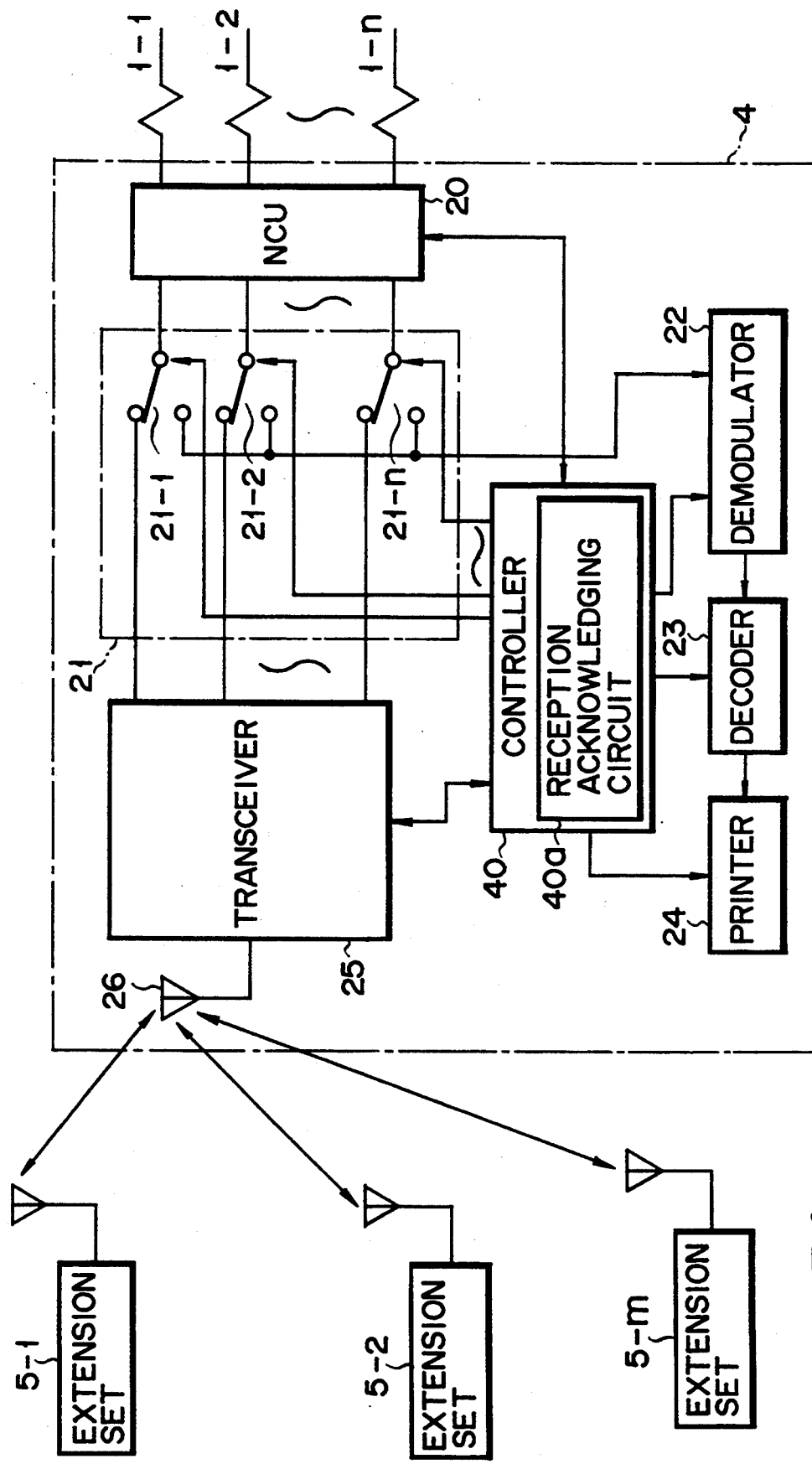
FIG. 3A is a block diagram showing a facsimile system according to another embodiment of the present invention.

FIG. 3A is a block diagram showing an arrangement of a facsimile system of this embodiment. The same reference numerals as in the first embodiment of FIG. 1A denote the same parts in the second embodiment, and a detailed description thereof will be omitted.

This facsimile system comprises a base station 4 connected to n telephone networks 1-1, 1-2, ..., 1-n serving as wire networks, and m extension sets 5-1, 5-2, ..., 5-m connected through the base station 4 through radio networks. The base station 4 and the extension sets 5-1 to 5-m have substantially the same arrangements as those of the base station 2 and the extension sets 3-1 to 3-m in the facsimile system of the first embodiment, except for the following points. That is, the base station 4 comprises a controller (to be referred to as a base station controller hereinafter) 40 in place of the base station controller 27 of the first embodiment. As in the base station controller 27 in the first embodiment, the base station controller 40 controls all the circuit elements constituting the base station 4. However, the base station controller 40 has a reception acknowledging circuit 40a for acknowledging facsimile reception to any one of the extension sets 5-1 to 5-m and have other control sequences. Each of the extension sets 5-1 to 5-m has a controller (to be referred to as an extension set controller hereinafter) 50 (shown in FIG. 3B) in place of the extension set controller 37 of the first embodiment. As in the extension set controller 37 of the first embodiment, the extension set controller 50 comprises, e.g., a microcomputer as a main control circuit and controls all the circuit elements constituting each of the extension sets 5-1 to 5-m. The extension set controller 50 comprises a reception alarming control circuit 50a for alarming to the user facsimile reception detected when generation of facsimile reception is acknowledged from the base station 4. Other control sequences of the extension set controller 50 are also different from the extension set controller 37.

Operations of the facsimile system having the above arrangement will be described with reference to control sequences of the base station and extension set controllers 40 and 50 in conjunction with FIGS. 4A and 4B.

Figure 4A:
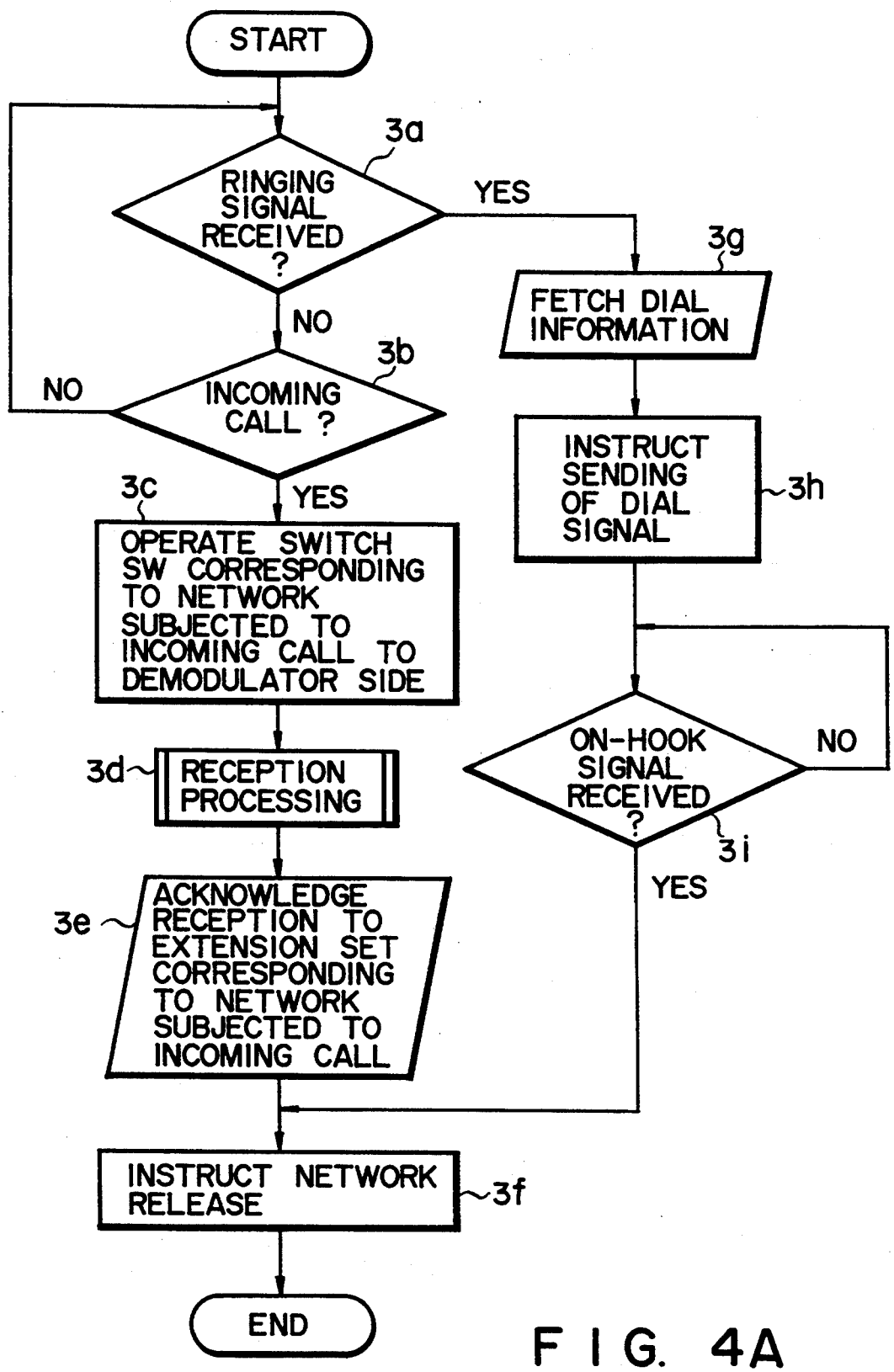
FIGS. 4A and 4B are flow charts showing processing sequences of a base station controller and an extension set controller which are shown in FIGS. 3A
Figure 4B:
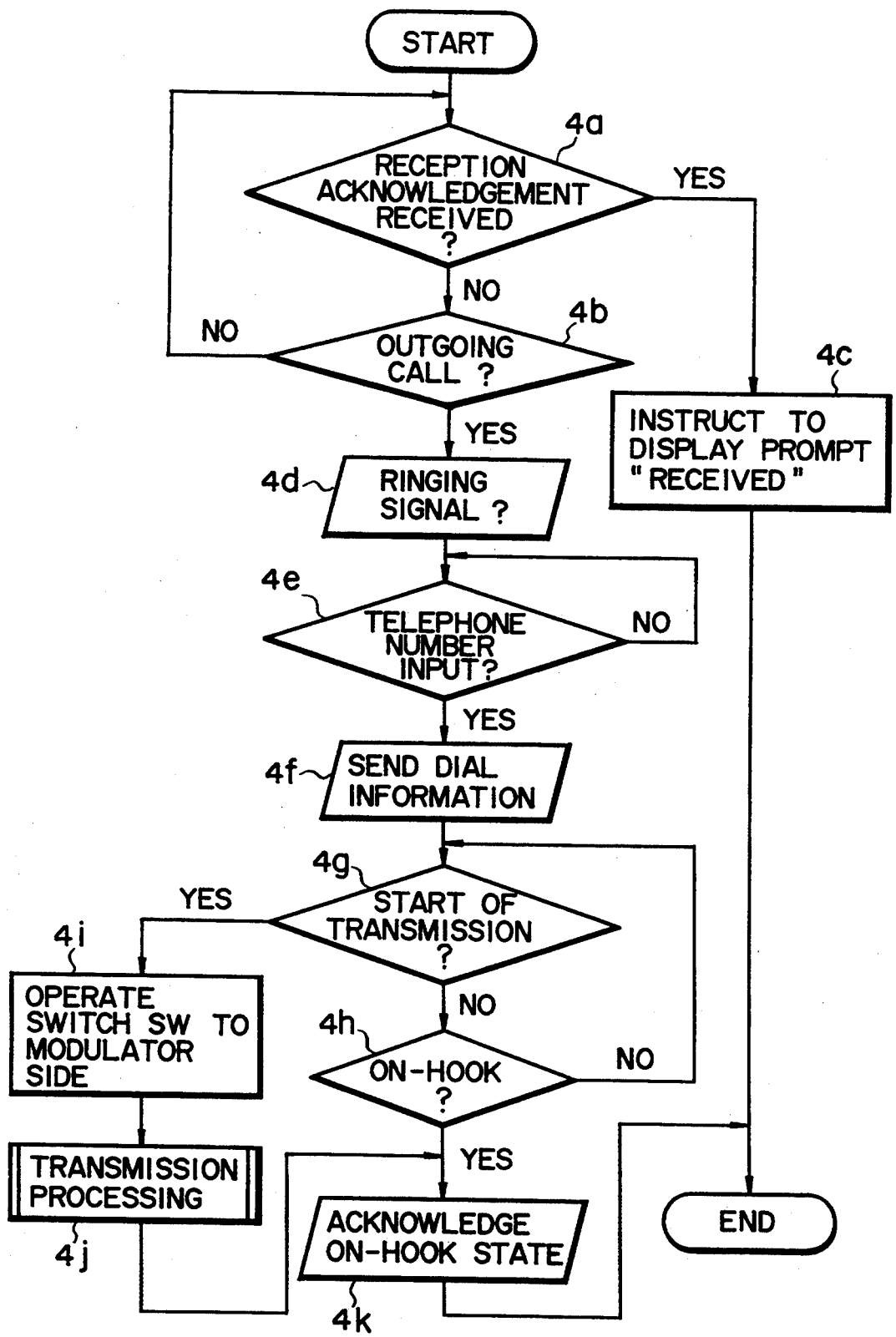

The base station controller 40 repeatedly monitors reception of a ringing signal and generation of an incoming call in the standby state in steps 3a and 3b of FIG. 4A. The extension set controller 50 repeatedly monitors reception of a reception acknowledgement signal and generation of an outgoing call in the standby state in steps 4a and 4b of FIG. 4B.

In this standby state, when an outgoing call is made, the flow of the base station controller 40 is advances from step 3b to step 3c. In step 3c, the base station controller 40 causes a switch (e.g., 21-1) corresponding to a telephone network (e.g., 1-1) subjected to the incoming call to operate to a position corresponding to a demodulator 22. The base station controller 40 causes the demodulator 22, a decoder 23, and an output device 24 to perform reception processing in accordance with a known general sequence. Upon completion of reception processing, the base station controller 40 performs reception acknowledgement to the extension set (e.g., 5-1) corresponding to the telephone network (e.g., 1-1) subjected to the incoming call in step 3e, and the processing is ended. Note that the process in step 3e is performed by the reception acknowledging circuit 40a.

When reception acknowledgement is performed from the base station 4 to the extension set 5-1, the flow of the extension set controller 50 advances from step 4a to step 4c. In step 4c, the extension set controller 50 instructs to display a prompt "received" on a display section 38b, and the processing is ended. The display section 38b turns on an LED for indicating the prompt "received" or causes an LCD to display characters or an image. This indication or display can be canceled by a reset operation on an operation section 38a. Note that the process in step 4c is performed by the reception alarming control circuit 50a.

On the other hand, when the base station and extension set controllers 40 and 50 are kept in the standby state, and an outgoing call is made, the base station and extension set controllers 40 and 50 perform the same operations as in the first embodiment in steps 3g to 3f and steps 4d to 4k.

In this embodiment, the same effect as in the first embodiment can be obtained. In addition, facsimile reception can be automatically performed by the base station 4 without being through an operation of the operator, thereby further reducing the load on the operator.

Figure 5:
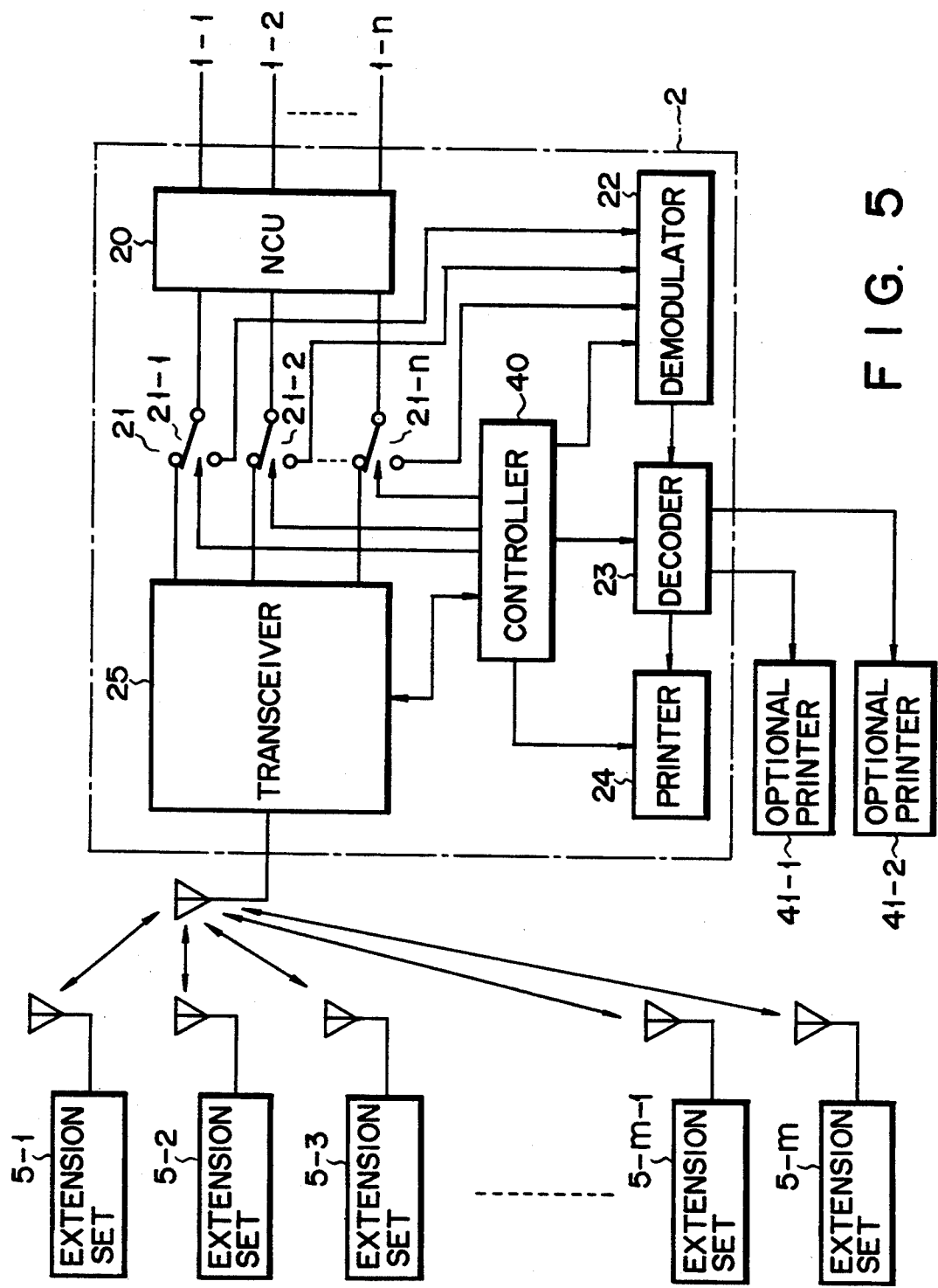
FIG. 5 is a block diagram of a facsimile system having an optional printer according to still another embodiment of the present invention.

In the above embodiment, a printer i.e., the output device 24 is arranged in the extension set 2. A base station 2 may be connected to a plurality of optional printers 41-1 and 41-2, as shown in FIG. 5. When call signals are generated through some of a plurality of telephone networks 1-1 to 1-n, these calls are transmitted to the base station controller 40 through a transceiver 25 under the control of an NCU 20. At this time, the switches in switching circuits 21 which correspond to the call signals are switched to a demodulator 22 by the base station controller 40. A plurality of image signals are input to and demodulated by the demodulator 22. The plurality of demodulated signals are decoded by a decoders 23, and are supplied to the printer 24 and the optional printers 41-1 and 41-2. These signals are temporarily stored in memories arranged in these printers and are then output. At this time, the base station controller 40 acknowledges facsimile reception to extension sets corresponding to extension sets 5-1 to 5-m.

Figure 6:
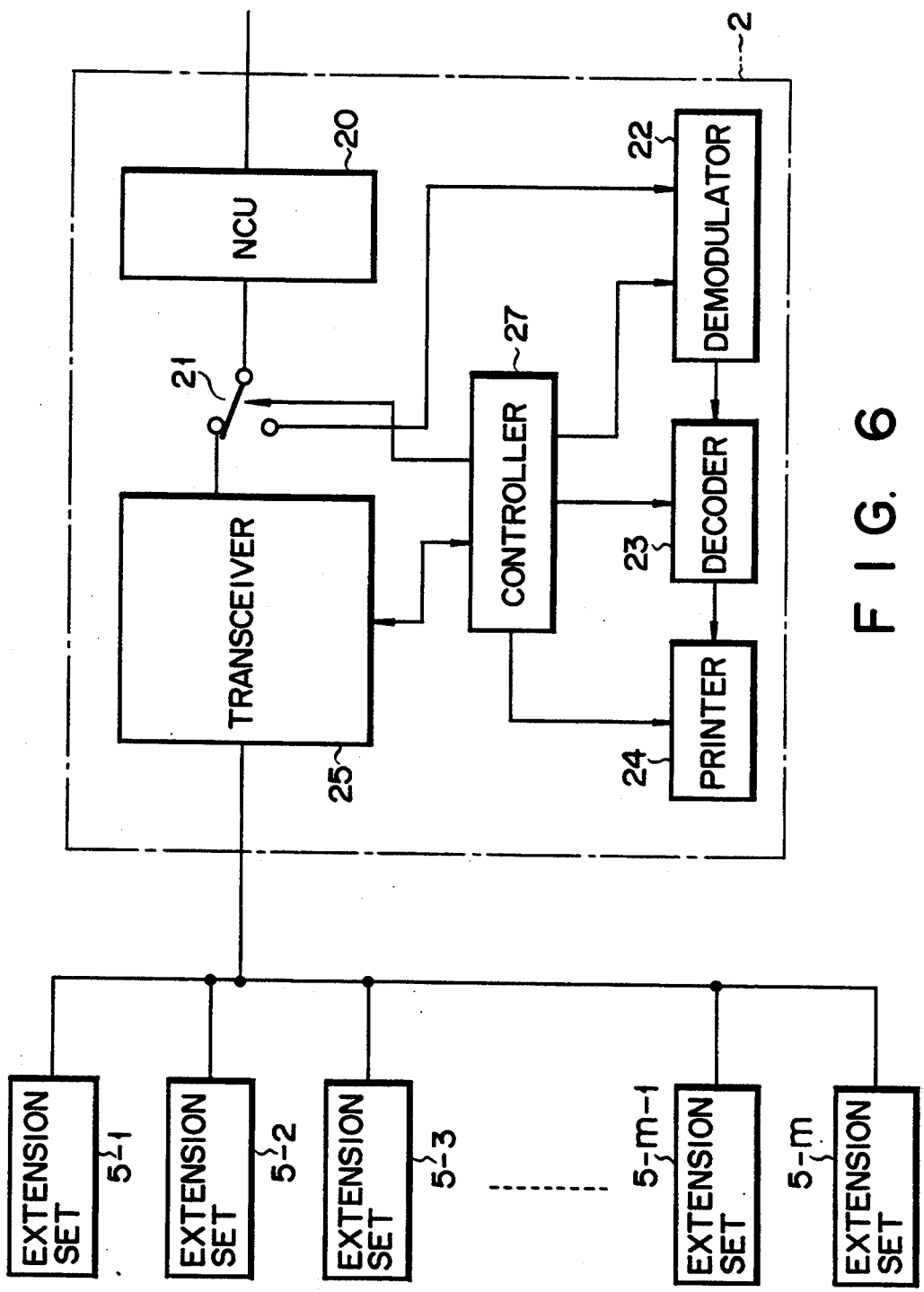
FIG. 6 is a block diagram of a facsimile system in which a base station is connected to extension sets through wire networks according to still another embodiment of the present invention.

In the above embodiment, the base station 2 is connected to the plurality of extension sets 5-1 to 5-m through radio networks. As shown in FIG. 6, these may be connected through wire networks. As shown in FIG. 6, when a base station 2 receives the call signal from one telephone network 1 connected to a base station 2, a base station controller 27 may perform multi-access of all the extension sets 5-1 to 5-m or a predetermined group of the extension sets 5-1 to 5-m, e.g., the extension sets 5-1 to 5-5. In addition, when the accessed extension set is set in an automatic answering mode, the base station controller 27 may call other extension sets.

Additional advantages and modifications will readily occur to those skilled in the art. Therefore, the invention in its broader aspects is not limited to the specific details, representative devices, and shown and described herein. Accordingly, various modifications may be without departing from the spirit or scope of the general inventive concept as defined by the appended claims and their equivalents.

What is claimed is:

1. A facsimile system comprising:
   a base station connected to at least one wire network and having a facsimile transmission and reception function; and
   at least one extension set connected to said base station and having a facsimile transmission function,
   said base station comprising:
   first receiving means for receiving an image signal through said wire network,
   image output means including a printer for outputting as printed matter an image corresponding to the image signal received by said first receiving means,
   calling means for calling said extension set in response to g call signal received through said wire network and for sending a facsimile reception informing signal to said extension set,
   switching means for connecting said wire network to said first receiving means in response to a response signal sent back from said extension set called by said calling means, and
   second receiving means for receiving an image signal transmitted from said extension set and sending the image signal to said wire network, and
   said extension set comprising:
   reading means for generating an image signal corresponding to a document image,
   transmitting means for transmitting the image signal generated by said reading means to said base station, and
   output means including at least one of display means for visually informing of a facsimile reception and sound means for audibly informing of facsimile reception in response to the facsimile reception informing signal from said base station, and excluding a printer for outputting an image as printed matter of the image signal received by said first receiving means, which is to be sent to said extension set, is printed out by said image output means of said base station.

2. The system according to claim 1, wherein said reading means arranged in said extension set comprises an optical scanner for optically scanning a document to read the original image.

3. The system according to claim 1, wherein said second receiving means of said base station and said transmitting means of said extension set comprise means for connecting said base station and said extension set through a radio network.

4. The system according to claim 1, wherein said base station is connected to a plurality of extension sets through radio networks, and said calling means of said base station comprises means for calling said plurality of extension sets.

5. The system according to claim 4, wherein said calling means of said base station comprises means for calling said plurality of extension sets in units of groups.

6. The system according to claim 1, wherein said base station is connected to a plurality of wire networks, and said output means comprises a plurality of printers for printing out a plurality of image signals transmitted through said plurality of wire networks, respectively.

7. The system according to claim 1, wherein said base station and said extension set are connected through a wire network.

8. The system according to claim 1, wherein said base station is connected to a plurality of wire networks and a plurality of extension sets corresponding to said plurality of wire networks, and said calling means comprises means for calling one of said plurality of extension sets in response to a call signal received through each of said plurality of wire networks.

* * * * *